United States Patent Office 3,360,361
Patented Dec. 26, 1967

3,360,361
METHOD OF MAKING FOAMED METAL
Denton M. Albright, Penn Hills Township, Allegheny County, and Walter R. Chilcott, Jr., Forest Hills Borough, Pa., and Themistocles P. Floridis, Blacksburg, Va., assignors to United States Steel Corporation, a corporation of Delaware
No Drawing. Filed Aug. 6, 1964, Ser. No. 387,982
5 Claims. (Cl. 75—20)

This invention relates to a process for making foamed metal. More particularly, the invention is directed to a method of producing foamed bodies of iron, magnesium, aluminum or titanium.

Characteristic of metal foam is a combination of high strength and low density. These properties are particularly desirable in structural materials and metal foam of high strength can be advantageously used for the fabrication of structural shapes. Although foamed metal has been known for a long time, it has only recently become commercially important, primarily through application in the construction industry.

Various techniques for foaming metal have been suggested. The most successful of these generally involve the addition of a gas or a gas-forming substance to molten metal. When a gas-former is used, thermal decomposition is relied upon to release a gas that expands the metal to a foam which is permitted to solidify prior to collapse of the foam. Typically, efforts at foaming metal have been confined to light metals such as aluminum. Although it has been suggested that the same techniques useful in producing aluminum foam could be used in producing iron foams, we have found by actual testing that this is not the case. Thus, insofar as iron is concerned, the invention enables the production of foamed metal bodies which were heretofore not capable of manufacture. The terms "ferrous metal" or "ferrous alloy" as used herein include iron and iron alloys. Although foams of light metals such as aluminum have been made previously, improved foamed articles of these metals can be made by our novel process.

According to the invention, foams of iron or iron alloys, magnesium, aluminum or titanium are made by providing a melt of the metal, adding simultaneously a thermally decomposable, gas-former and a foam-promoter and agitating the melt to distribute the materials within it. Agitation may be accomplished by simple stirring or by the introduction of the gas-former and promoter themselves such as by injection into the melt. The gas-former is decomposed by the heat of the melt and the released gas causes the metal to foam. The foamed melt is cooled before the foam collapses and the result is a solidified foamed metal article. The foam-promoter, according to the invention, consists essentially of a substance having a melting point greater than the metal base and which is alloyable with it. The term "alloyable" as used herein means capable of being dissolved in the base metal. The gas-formers useful in our process decompose at normal atmospheric pressure under the conditions of melting and are compatible with the particular system, i.e. have a decomposition rate conducive to good foam production. The preferred gas-formers useful in the invention are metal hydrides such as zirconium hydride and titanium hydride. Various foam promoters can be used, however, it is essential that they be alloyable with the matrix metal and have a melting point greater than it. For optimum use, the foam-promoter should have a melting point considerably higher than the metal base, e.g., at least 150° F. higher, and preferably at least 1000° F. higher, than the ferrous metal. Preferred materials for use as foam-promoters include molybdenum, tungsten, ferrotungsten, and metal carbides such as vanadium carbide, chromium carbide, and tungsten carbide. The gas-former and foam-promoter may be added to a melt as a powder mixture or as preformed pellets or agglomerates. In addition, the foam-promoter and gas-former may be introduced to the melt separately but must be added at the same time.

The most common technique for producing foamed metal such as aluminum foam involves the addition of zirconium hydride to a melt of aluminum. The foam forms easily and can be solidified by cooling to produce a foam metal product. Although previous investigators have suggested the application of this technique to produce foamed ferrous metal, it has been found that zirconium hydride alone cannot be used to make foamed iron or iron alloy articles. As an illustration, a sample of cast iron was heated to a temperature of about 2600° F. in an induction furnace and a zirconium hydride powder was added to the molten metal while stirring. The zirconium hydride decomposed to yield hydrogen gas, but no foaming was observed.

In contrast to the above where zirconium hydride alone was added to the iron melt, foaming is produced and a foamed body can be made by adding a mixture of a gas-former such as zirconium hydride and a foam-promoter having the characteristics of higher melting point and alloyability to a melt of the metal. The following examples illustrate the practice of the invention in several embodiments.

*Example I*

A 520 gram sample of cast iron was heated in a crucible to a temperature of 2650° F. A previously prepared mixture consisting of 20 grams of tungsten metal powder and 20 grams of zirconium hydride powder was added to the molten metal while stirring. Within a few seconds the metal began to foam and rise in the crucible. The molten contents of the crucible were poured into a mold. Upon solidification the sample was removed from the mold and its structure examined. The product was found to be a foam characterized by many small and discrete cavities and having a density of 3.99 grams per cubic centimeter, or about 51 percent of the theoretical density of iron.

*Example II*

A sample of 748 grams of iron was melted and a mixture consisting of 24 grams of ferrotungsten powder and 20 grams of zirconium hydride powder was added to the melt while agitating to distribute the mixture. The foam metal product upon solidification was found to have a density of 54 percent of the theoretical density of iron.

The following table summarizes a series of tests with ferrous metal bases conducted as above, using a thermally decomposable gas-former and different foam-promoters and the condition of the resulting products in which either foam was produced or no foam appeared, is noted. In all cases in which a foam body was produced, a foam-promoter was used which was both alloyable with the metal base and which had a melting point greater than the melting point of the matrix metal.

| Gas-former | Foam-promoter | Product |
|---|---|---|
| Zirconium hydride | Molybdenum | Foam. |
| Do | Tungsten carbide | Do. |
| Do | Vanadium carbide | Do. |
| Do | Copper | No Foam. |
| Do | Manganese | Do. |
| Do | Iron | Do. |
| Do | Nickel | Do. |
| Do | Tungsten | Foam. |
| Titanium hydride | ____do____ | Do. |
| Zirconium hydride | Ferrotungsten (80% W) | Do. |
| Do | Aluminum oxide | No Foam. |
| Do | Silica | Do. |
| Do | Cobalt-molybdate alumina | Do. |
| Do | Tungsten-nickel sulfide | Do. |
| Do | Tungsten sulfide | Do. |
| Do | Chromia-alumina | Do. |
| Do | Chromium carbide | Foam. |

Improved foam bodies of aluminum, magnesium and titanium can also be produced by using a foam promoter in conjunction with the gas-former. As an illustration, tests for purposes of comparison were conducted on aluminum bases in which a zirconium hydride gas-former was used. In one test iron powder was included as a foam-promoter and in the other test no promoter was used. It was observed that more foam resulted in the samples that included the iron foam-promoter than in the sample omitting the promoter.

The process for producing foamed metal bodies according to the invention is applicable to both low-carbon and high-carbon steels. As an illustration a test was performed using 2200 grams of electrolytic iron and 55 grams of electrode-grade graphite mixed together and melted in a refractory crucible. The resulting metal contained about 2.0 percent carbon. A mixture of 40 grams of tungsten powder and 40 grams of zirconium hydride was added to the melt and foaming occurred. After solidification, a foamed ferrous product was obtained.

Although it is not known precisely how the foam-promoter functions, it is believed that the promoter acts either as nucleation site for the resulting gas bubbles or as a foam stabilizer by retarding collapse of the foam. It is possible that the promoter actually performs both of these functions. This theory explains another phenomenon observed in extensive testing. It has been found that it is insufficient for the foam-promoter to be present in the system merely as an alloy adjunct dissolved in or forming a constituent of the melt. For foaming to occur in iron or iron alloy systems and for improved foaming in aluminum, magnesium, and titanium, the foam-promoter must be added simultaneously with the gas-former. It is only when the foam-promoter and gas-former are added at the same time that satisfactory foaming is obtained and, in the case of ferrous alloys, that any foaming is obtained.

A review of the results of many tests demonstrates the necessity for the foam-promoter to be alloyable with the ferrous metal base and have a melting point higher than the ferrous metal. Thus, as shown above, iron powder did not promote the formation of an iron-base foam, however, iron is useful in promoting foaming of aluminum since its melting point is considerably greater than the melting point of aluminum and the two are alloyable. Similarly, silicon carbide and alumina did not promote iron-base foams notwithstanding their relatively high melting points, because they are not alloyable with the ferrous base.

We claim:

1. A process of making an improved foamed body of a metal from the group consisting of iron, aluminum, magnesium and titanium, comprising providing a melt of said metal, adding to said melt simultaneously a foam-promoter and a compatible, thermally-decomposable, gas-former while agitating to distribute said foam-promoter and gas-former within the melt, said foam-promoter comprising a substance alloyable with said metal and having a melting point higher than said metal, said gas-former being decomposed by the heat of the melt causing said metal to foam, and cooling to provide solidified, foamed metal.

2. A process according to claim 1 wherein said foam-promoter has a melting point at least about 150° F. higher than said metal.

3. A process according to claim 1 wherein said foam-promoter is a substance from the group consisting of molybdenum, tungsten, ferrotungsten, chromium carbide, vanadium carbide, and tungsten carbide.

4. A process according to claim 1 wherein said gas-former is a substance from the group consisting of zirconium hydride and titanium hydride.

5. A process of making improved foamed ferrous metal comprising providing a melt of ferrous metal, preparing a mixture of a foam-promoter from the group consisting of molybdenum, tungsten, ferrotungsten, and metal carbides and a thermally decomposable gas-former from the group consisting of zirconium hydride and titanium hydride, said foam-promoter being alloyable with said ferrous metal and having a melting point at least about 150° F. higher than said ferrous metal, adding said mixture slowly to said melt while agitating said melt to distribute said mixture in the melt whereby said gas-former is decomposed by the heat of the melt causing said ferrous metal to foam, and cooling to provide solidified, foamed ferrous metal.

References Cited
UNITED STATES PATENTS

| | | | |
|---|---|---|---|
| 3,297,431 | 1/1967 | Ridgway | 75—20 |
| 2,751,289 | 6/1956 | Elliott | 75—20 |
| 2,895,819 | 7/1959 | Fiedler | 75—20 |
| 2,983,597 | 5/1961 | Elliott | 75—20 |
| 3,214,265 | 10/1965 | Fiedler | 75—20 |

BENJAMIN HENKIN, *Primary Examiner.*